P. & H. ROOS.
BROILER.
APPLICATION FILED NOV. 2, 1915.

1,173,742.

Patented Feb. 29, 1916.

Inventors
Philip Roos
Henry Roos
By Their Attorneys
Kerr Page Cooper + Hayward

UNITED STATES PATENT OFFICE.

PHILIP ROOS AND HENRY ROOS, OF NEW YORK, N. Y.

BROILER.

1,173,742.   Specification of Letters Patent.   Patented Feb. 29, 1916.

Application filed November 2, 1915. Serial No. 59,267.

*To all whom it may concern:*

Be it known that we, PHILIP ROOS and HENRY ROOS, citizens of the United States, residing at New York, in the county and State of New York, have invented certain new and useful Improvements in Broilers, of which the following is a full, clear, and exact description.

The invention for which we now make application for Letters Patent of the United States is an improvement in broilers for hotels, grill rooms and the like, but applicable generally for the purpose under any circumstances which demand the use of such a device. For purposes of illustration we have shown and described herein this improved mechanism as one dependent for its heat upon a series or beds of gas jets, but the invention, as will be more fully recognized from what follows, is not limited in this respect. For example, the heat may be produced by conductors brought to proper incandescence by an electric current, and with suitable and well understood modifications in the means employed, the currents of electricity may be turned on or off or modified in the same manner, broadly considered, as currents of gas. Hence, while confining the description to gas heaters, it will be understood that we include also such heaters as depend upon electricity, and that the specific devices are not limited in this respect, although no further reference be herein made to this fact.

The main objects of our invention are, among other things, economy of fuel, saving of time, and greater facility in the handling of the device and the cooking of food by its use. To attain these objects we have devised a broiler in which the food to be cooked is exposed simultaneously to the effects of heat on both sides, thus reducing practically to one half the time required to perform the work, and in which automatic means are provided whereby the ordinary manipulation of the parts turns on or off the flow of gas to the burners or modifies it to any desired degree to save fuel that would otherwise be wasted.

The most important and distinguishing feature of our new device resides in the combination with a stationary griddle with burners thereunder, of a top portion or element, also with burners, that may be adjusted to different levels over the same or turned back so as to entirely expose it, and in such combination, together with means specifically described herein for adjusting said top for controlling the gas for scoring the food while cooking and other details, the invention resides.

Our improvement is illustrated in the accompanying drawing, in which—

Figure 1:
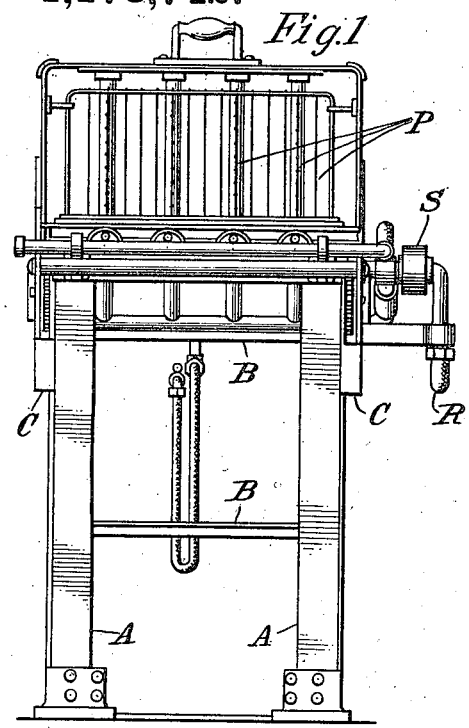
Figure 2:
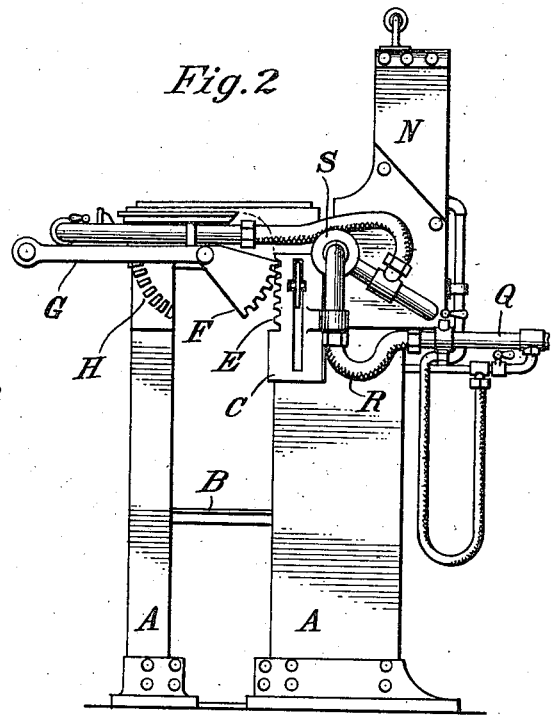
Figure 3:
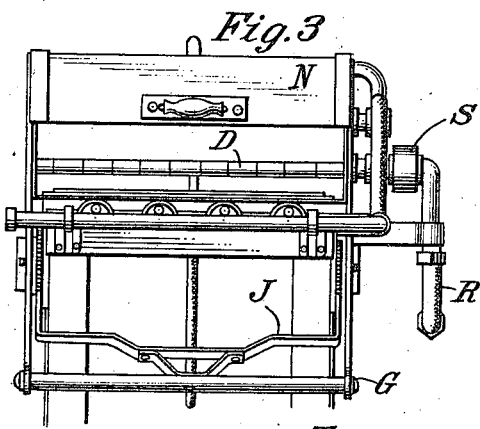
Figure 4:
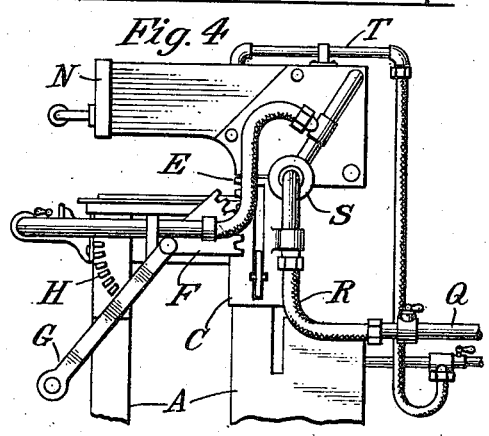
Figure 5:
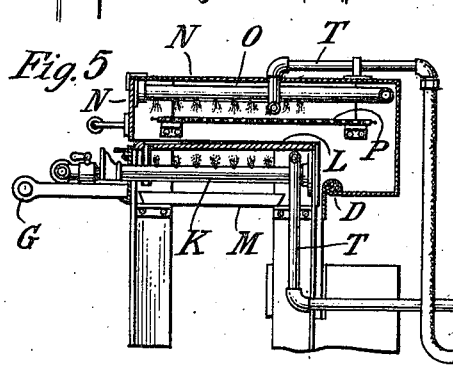
Figure 6:

Figure 1 is a front elevation of the complete device with the movable top or upper portion in its lowest position, and thrown back as it is when the device is not in use. Fig. 2 is a side elevation of the same parts. Fig. 3 is a front elevation of the device with the top in its raised position and turned down into its normal position in use. Fig. 4 is a side elevation of the same parts in the same relations. Fig. 5 is a central vertical section of Fig. 3, and Fig. 6 is a detailed view illustrating the principle of our improved griddle.

Similar letters of reference in the figures refer to corresponding parts.

The frame of the device is composed of upright angle irons A and horizontal irons B, with suitable supporting feet. Fitted to this frame and adapted to move vertically with respect thereto are slides C, to which by hinges D the top portion of the device is attached. Along the edge of one of the slides C are teeth E with which engages a toothed sector F, rigidly connected with one of the arms G pivoted to the frame, and by the manipulation of which the slides and top may be lowered or raised. It will be understood without more specific illustration or description that a toothed sector and engaging teeth may be employed on each side of the griddle if so desired.

When the device is not in use, the frame or arms G is raised and the top lowered and turned back on its hinge. In use, the arms are lowered and the top is swung forward. In order to maintain the top at any intermediate level above the griddle, ratchet teeth H, on one or both sides of the frame, are provided with which the ends of a steel spring J, secured in any convenient manner to arms G, may engage or from which they may be withdrawn by compressing the spring. Any equivalent means for accomplishing the same purpose may obviously be employed. Secured in the frame are a series of gas jets K, under the griddle L, and under both is a drip pan M. In the top portion N is likewise a series of gas jets O and metallic wires or rods P, the sides or ends of the frame carrying which slide in guide ways in the sides of the top, to rest by gravity upon the food cooking and produce the burnt marks or scores characteristic of material cooked on a broiler. The gas is supplied from a main pipe Q, from which it is carried by a flexible pipe R to a valve S concentrically mounted with the hinge D and from which it is led to the upper and lower series of burners. This valve is operated by the forward and back movement of the top N to admit gas when the top is turned down and shut it off when the latter is turned back, and for this purpose the pipe leading to the valve is secured to one of the slides C. In order, however, that some flame may persist even when the device is not in actual use, pilot pipes T T run from the main to both sets of burners which furnish at all times a small amount of gas, just sufficient to ignite the burner when the device is brought into use.

In Fig. 6 is shown the general form of broiler which we use with this device. It is either cast or rolled and comprises an iron or steel polished plate L with V-shaped grooves or corrugations with sharp edges between upon which the article to be cooked rests. This form of griddle secures a greater amount of heat conducting surface than one of wire or one which is flat or solid throughout.

Having now described our invention, what we claim is:

1. In a broiler, the combination with a supporting frame, a base portion and an upper portion movable and adjustable vertically with respect to each other, the upper portion being adapted to swing on hinges over the base portion, and heating elements contained in each portion, of a griddle arranged above the lower heating elements, whereby the upper frame portion may be turned down over the griddle so that articles of food on the latter will be exposed to the two heating elements at the same time.

2. In a broiler, the combination with a frame comprising independent upper and lower parts, vertically movable slides in the lower part to which the upper part is hinged so as to swing over the lower, a griddle placed in the lower part, and heating elements in both parts whereby articles of food on the griddle may be simultaneously exposed to both heating elements and at varying distances from the upper element.

3. In a broiler, the combination with a frame comprising two independent parts movable and adjustable vertically with respect to each other, the upper part hinged at the rear and adapted to swing on hinges over the lower part, a griddle arranged above the lower part, heating elements arranged in both parts and means for turning on or off the sources of heat therefrom, controlled by the swinging movement of the upper part.

4. In a broiler, the combination with a lower stationary part of a supporting frame, of an upper part hinged to the rear thereof and capable of being swung over said stationary part, the said hinged upper part being also capable of movement vertically with respect to the stationary part, and a griddle set in the stationary part and heating elements in both parts whereby articles of food on the griddle may be simultaneously exposed to heat on both sides, the upper source of heat being adjustable with respect thereto.

5. In a broiler, the combination with a frame composed of two independent parts, the upper part hinged in the rear to the lower part, and also capable of vertical adjustment with respect to the same, of gas jets arranged in both upper and lower parts, so as to be brought on opposite sides of a griddle, a pipe for supplying gas to the jets and a valve therein controlled by the movement of the upper part about its hinges for throwing on or off the gas.

6. In a broiler, the combination with a two part frame, the upper portion being hinged to the lower and capable also of vertical movement with respect thereto, of heating jets in both parts, a griddle adapted to be exposed to the jets on both sides at the same time and a series of scoring bars movable by gravity onto articles of food laid on the griddle.

7. In a broiler, the combination with a lower stationary part of a frame, of slides movable vertically thereon, an upper part of the frame hinged to said slides, an arm or lever pivoted to the stationary part of the frame and carrying a sector engaging with teeth on the slides for raising or lowering the upper part of the frame and gas jets placed in both parts of the frame so as to be on opposite sides of a griddle placed intermediate the two portions of the frame.

8. In a broiler, the combination with a stationary lower part of a frame, of a top part hinged thereto and movable also vertically with respect to said stationary part, a lever pivoted to the stationary part of the frame and engaging with a rack on the movable part, for moving the same up or down, and means for maintaining the movable part in any position to which it may have been adjusted by the movement of said lever.

In testimony whereof we affix our signatures.

PHILIP ROOS.
HENRY ROOS.